United States Patent
Ramani et al.

(10) Patent No.: US 8,392,757 B2
(45) Date of Patent: Mar. 5, 2013

(54) METHOD AND APPARATUS FOR PROCESSING LOAD INSTRUCTIONS IN A MICROPROCESSOR HAVING AN ENHANCED INSTRUCTION DECODER AND AN ENHANCED LOAD STORE UNIT

(75) Inventors: Krishnan Ramani, Cupertino, CA (US); Mike Butler, San Jose, CA (US); Kai Troester, Pepperell, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 285 days.

(21) Appl. No.: 12/910,136

(22) Filed: Oct. 22, 2010

(65) Prior Publication Data
US 2012/0102357 A1    Apr. 26, 2012

(51) Int. Cl.
G06F 11/00    (2006.01)
(52) U.S. Cl. .......................................................... 714/15
(58) Field of Classification Search .............. 714/10–17, 714/25–30, 39, 41
See application file for complete search history.

(56) References Cited

U.S. PATENT DOCUMENTS

| | | | | |
|---|---|---|---|---|
| 5,889,974 A * | 3/1999 | Harriman et al. | ............. | 712/218 |
| 6,505,293 B1 * | 1/2003 | Jourdan et al. | ................. | 712/217 |
| 6,854,075 B2 * | 2/2005 | Mukherjee et al. | ............. | 714/51 |
| 6,859,860 B2 * | 2/2005 | Saito et al. | ...................... | 711/118 |
| 7,506,106 B2 * | 3/2009 | Diefendorff | ................... | 711/137 |
| 7,770,064 B2 * | 8/2010 | Harper et al. | ................... | 714/15 |
| 2008/0082765 A1 * | 4/2008 | Hily et al. | ...................... | 711/154 |

* cited by examiner

Primary Examiner — Nadeem Iqbal
(74) Attorney, Agent, or Firm — Volpe and Koenig, P.C.

(57) ABSTRACT

A method and microprocessor are described for efficiently executing load instructions out-of-order (speculatively). The microprocessor includes an enhanced load store unit (LSU) and an enhanced instruction decoder. The enhanced LSU receives a plurality of out-of-order value addresses, and sends a resync signal to the enhanced instruction decoder when an execution error associated with a particular load instruction occurs. The enhanced instruction decoder stores a specific address associated with the particular load instruction, and increments a counter value that indicates how many times the resync signal was sent by the resync predictor. When the counter value reaches a predetermined threshold, subsequent load instructions from the specific address are executed in order (non-speculatively). When a future execution of the particular load instruction indicates that the probability of an execution error has been reduced, the counter value is decremented, facilitating newer load instructions associated with the same address to again be executed speculatively.

18 Claims, 5 Drawing Sheets

METHOD AND APPARATUS FOR PROCESSING LOAD INSTRUCTIONS IN A MICROPROCESSOR HAVING AN ENHANCED INSTRUCTION DECODER AND AN ENHANCED LOAD STORE UNIT

FIELD OF INVENTION

This application is related to a high performance microprocessor.

BACKGROUND

Modern high performance out-of-order (speculative) executing microprocessors execute loads and stores out-of-order. There are occasions during the processing whereby a load may be erroneously executed before it has seen the correct interlocking store. When such occasions are detected, the errant load is re-executed by resyncing so that the load and all younger instructions in the pipeline are flushed. Although this ensures that load instructions are correctly executed, each of these resyncs wastes an execution opportunity, resulting in loss of performance.

FIG. 1 shows a conventional out-of-order executing microprocessor 100. The microprocessor 100 includes an integer fetch unit (IFU) 105, an instruction decoder 110, an instruction scheduler 115, a register file 120, an arithmetic and logic unit (ALU) 125, a write back unit (WBU) 130, an address generation unit (AGU) 135, a load store unit (LSU) 140, and a memory 145.

Still referring to FIG. 1, as an ongoing process, the IFU 105 sends instruction/address requests 150 that request an external memory 155 to send instruction bytes 160 from particular addresses. The IFU 105 outputs the instruction bytes 160 to the instruction decoder 110, which decodes the instruction bytes 160 such that each instruction is uniquely identified by a certain combination of bits. The instruction decoder 110 has the knowledge to interpret these instructions and, for example, determine whether an instruction is performing an "add" or a "multiply" function.

The instruction decoder 110 outputs decoded instructions 162 to the instruction scheduler 115, which orchestrates the order (i.e., scheduling) of the decoded instructions, and outputs ordered decoded instructions 164 to the register file 120. The register file 120 provides operands 166 for executing the ordered decoded instructions 164 to the ALU 125 and the AGU 135. The ALU 125 executes simple instructions which do not involve memory, (i.e., instructions which are purely arithmetical or purely logical and do not involve memory), and outputs execution results 168 to the WBU 130.

The WBU 130 essentially feeds back the execution results (by outputting feedback execution results 170) to the register file 120, after determining which addresses in the register file 120 to store the feedback execution results 170. The AGU 135 generates value addresses 174 to fetch values from the memory 145, and inputs the value addresses 174 to the LSU 140. The LSU 140 receives the value addresses 174 from the AGU 135, and also receives stored data results 176 from the register file 120, and determines the order in which the value addresses 174 are sent to the memory 145, such that the memory 145 fetches data located at particular addresses. The LSU 140 outputs the stored data results 176 to the memory 145 to write data, and outputs data/address requests 178 to the memory 145 to read data. The memory 145 outputs execution byte results 180 to the register file 120.

The responsibility of the LSU 140 is to schedule instructions to memory in an efficient way, such that overall performance of a system is satisfactory. The AGU 135 provides value addresses 174 to the LSU 140 that are not in a particular order. It is the responsibility of the LSU 140 to make sure that when it communicates with the memory 145, it does so in a methodical order to provide error-free execution results without reducing efficiency. However, since the LSU 140 in the microprocessor 100 of FIG. 1 typically executes instructions in a particular order, the LSU 140 is constrained from maximizing efficiency and performance.

A value address is essentially a request to memory to fetch data from a particular address. A store address is essentially a request to memory to write data to a particular event.

For example, if there exists a series of compilations whereby a first instruction indicates that c=a+b, and a second instruction indicates that e=2c+d, it is essential that the first instruction be executed before the second instruction. Otherwise, an error will occur.

If data is written in a particular memory location, followed by a read from that memory location, it is important to ensure that the data being read is the same data that was previously written. However, it is possible that the LSU 140 in the microprocessor 100 of FIG. 1 does not know what data is going to be written to another memory location that it wants to read. The LSU 140 may wait to make sure that all older stores have been written to memory before reading the data, which results in an undesired delay. Thus, every time a reading process from a different memory address begins, the probability of an error occurring is heightened.

SUMMARY

A method and microprocessor are described for efficiently executing load instructions out-of-order (speculatively). The microprocessor includes an enhanced load store unit (LSU) and an enhanced instruction decoder. The enhanced LSU receives a plurality of out-of-order value addresses. A resync predictor in the enhanced LSU detects an error in the order of the execution of instructions associated with one of the value addresses, and sends a resync signal to a memory in the enhanced instruction decoder. The resync signal indicates that a particular load instruction was incorrectly executed. The enhanced instruction decoder stores a specific address associated with the particular load instruction in a first field of a resync predictor table of the memory and increments a counter value associated with the particular load instruction that is stored in a second field of the resync predictor table. The counter value indicates how many times the resync signal was sent by the resync predictor.

The enhanced instruction decoder may set a predetermined counter value threshold, and compare the counter value associated with the particular load instruction to the predetermined counter value threshold. When decoding the particular load instruction, the enhanced instruction decoder determines whether or not the counter value associated with the particular load instruction reached the predetermined counter value threshold based on the comparison. The memory in the enhanced instruction decoder may send an in order hazard check (IOHC) signal to the resync predictor in the enhanced LSU if it is determined that the counter value associated with the particular load instruction reached the predetermined counter value threshold. The IOHC signal indicates that the particular load instruction should be executed in order. The resync predictor in the enhanced LSU may send a strength counter signal to the memory in the enhanced instruction decoder if the particular load instruction was executed successfully in order without detecting an older uncommitted store having the same address as the particular load instruction. The strength counter signal indicates that the risk associated with the particular load instruction being incorrectly executed has been substantially reduced. The enhanced instruction decoder may then decrement the counter value associated with the particular load instruction that is stored in the second field of the resync predictor table.

BRIEF DESCRIPTION OF THE DRAWINGS

A more detailed understanding may be had from the following description, given by way of example in conjunction with the accompanying drawings wherein.

DETAILED DESCRIPTION

Figure 1:
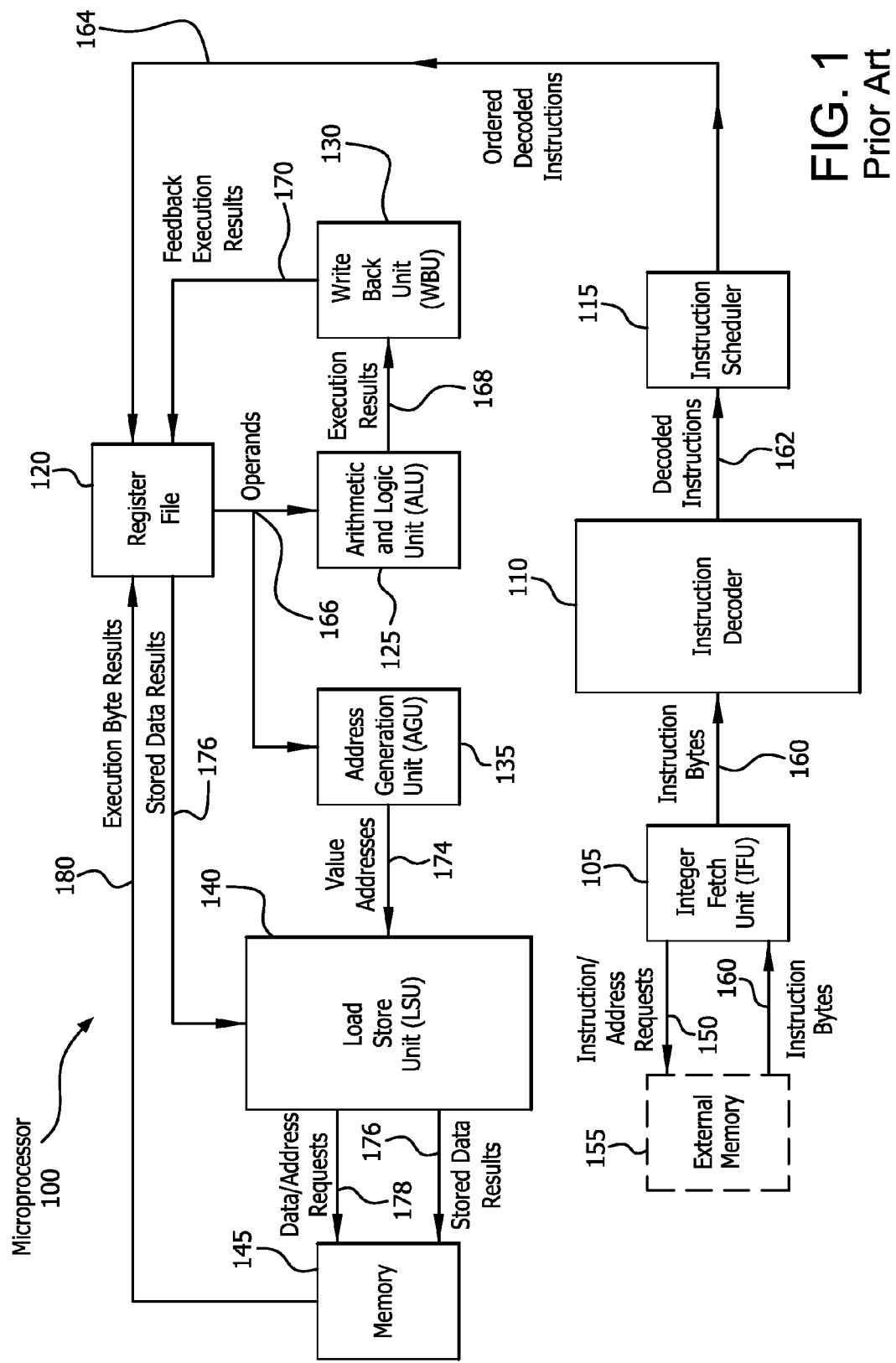
FIG. 1 shows a conventional out-of-order executing microprocessor.

The embodiments will be described with reference to the drawing figures wherein like numerals represent like elements throughout.

Figure 2:
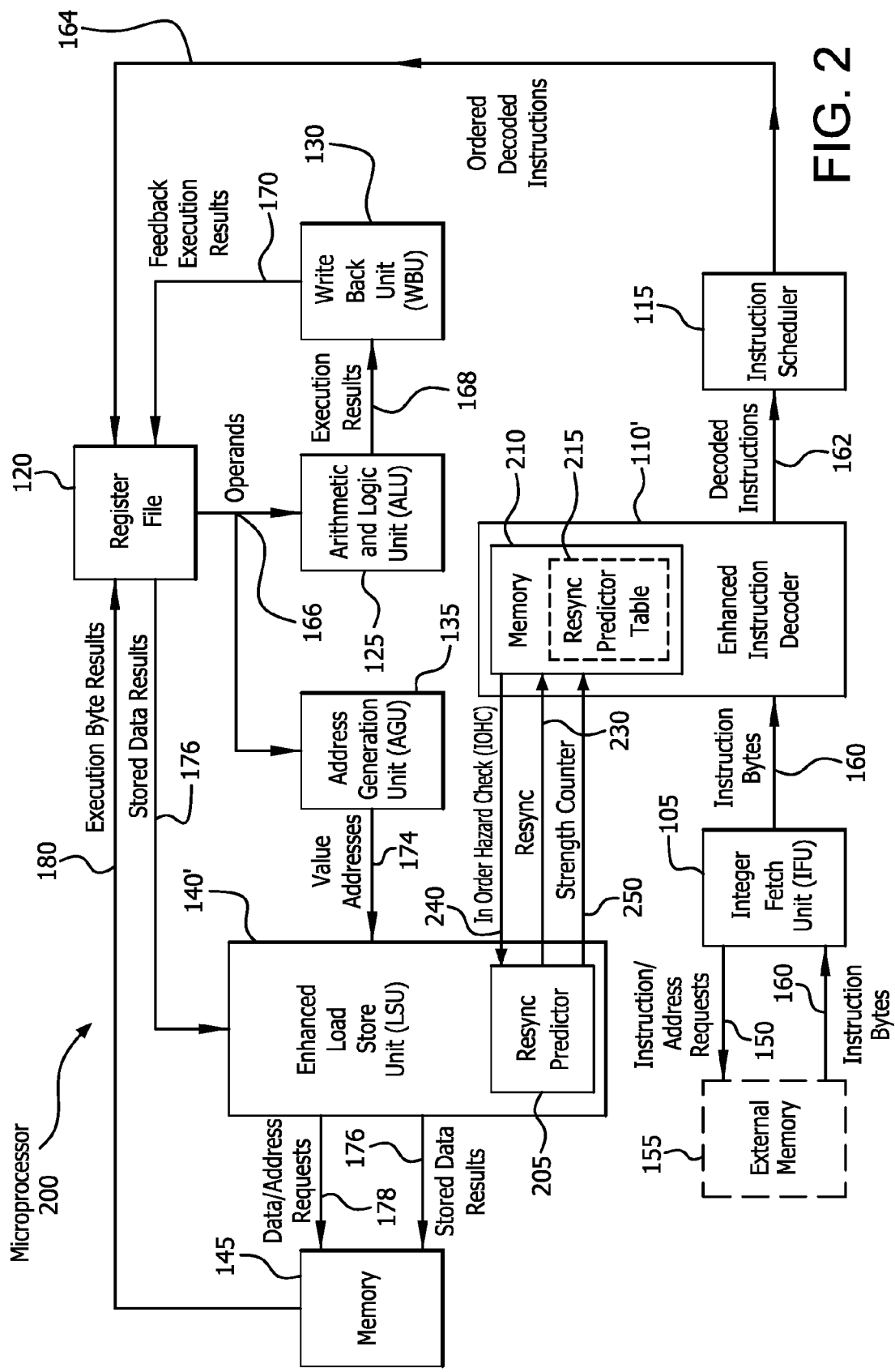
FIG. 2 shows an example of a microprocessor that is configured with an enhanced LSU having a resync predictor, and an instruction decoder having a memory with a resync predictor table, in accordance with the present invention.

FIG. 2 shows an example of a microprocessor 200 that is configured in accordance with the present invention. The microprocessor 200 comprises an integer fetch unit (IFU) 105, an enhanced instruction decoder 110', an instruction scheduler 115, a register file 120, an arithmetic and logic unit (ALU) 125, a write back unit (130), an address generation unit (AGU) 135, an enhanced load store unit (LSU) 140', and a memory 145.

Still referring to FIG. 2, as an ongoing process, the IFU 105 sends instruction/address requests 150 that request an external memory 155 to send instruction bytes 160 from particular addresses. The IFU 105 outputs the instruction bytes 160 to the enhanced instruction decoder 110', which decodes the instruction bytes 160 such that each instruction is uniquely identified by a certain combination of bits. The enhanced instruction decoder 110' has the knowledge to interpret these instructions and, for example, determine whether an instruction is performing an "add" or a "multiply" function. The enhanced instruction decoder 110' outputs decoded instructions 162 to the instruction scheduler 115, which orchestrates the order (i.e., scheduling) of the decoded instructions, and outputs ordered decoded instructions 164 to the register file 120. The register file 120 provides operands 166 for executing the ordered decoded instructions 164 to the ALU 125 and the AGU 135. The ALU 125 executes simple instructions which do not involve memory, (e.g., instructions which are purely arithmetical or purely logical), and outputs execution results 168 to the WBU 130.

The WBU 130 essentially feeds back the execution results (by outputting feedback execution results 170) to the register file 120, after determining which addresses in the register file 120 to store the feedback execution results 170. The AGU 135 generates value addresses 174 to fetch values from the memory 145, and inputs the value addresses 174 to the enhanced LSU 140'. The enhanced LSU 140' receives the value addresses 174 from the AGU 135, and also receives stored data results 176 from the register file 120, and determines the order in which the value addresses 174 are sent to the memory 145, such that the memory 145 fetches data located at particular addresses. The enhanced LSU 140' outputs the stored data results 176 to the memory 145 to write data, and outputs data/address requests 178 to the memory 145 to read data. The memory 145 outputs execution byte results 180 to the register file 120.

Still referring to FIG. 2, the enhanced LSU 140' includes a resync predictor 205, and the enhanced instruction decoder 110' includes a memory 210 that stores a resync predictor table 215. The enhanced LSU 140' and the enhanced instruction decoder 110' communicate with each other to enhance the efficiency of processing instructions, as will be explained in greater detail hereinafter. The enhanced LSU 140' detects whether there are errors in the order of execution of loads. If errors are detected, the errors are corrected by flushing the microprocessor and re-executing the instructions in the correct order.

Figure 3:
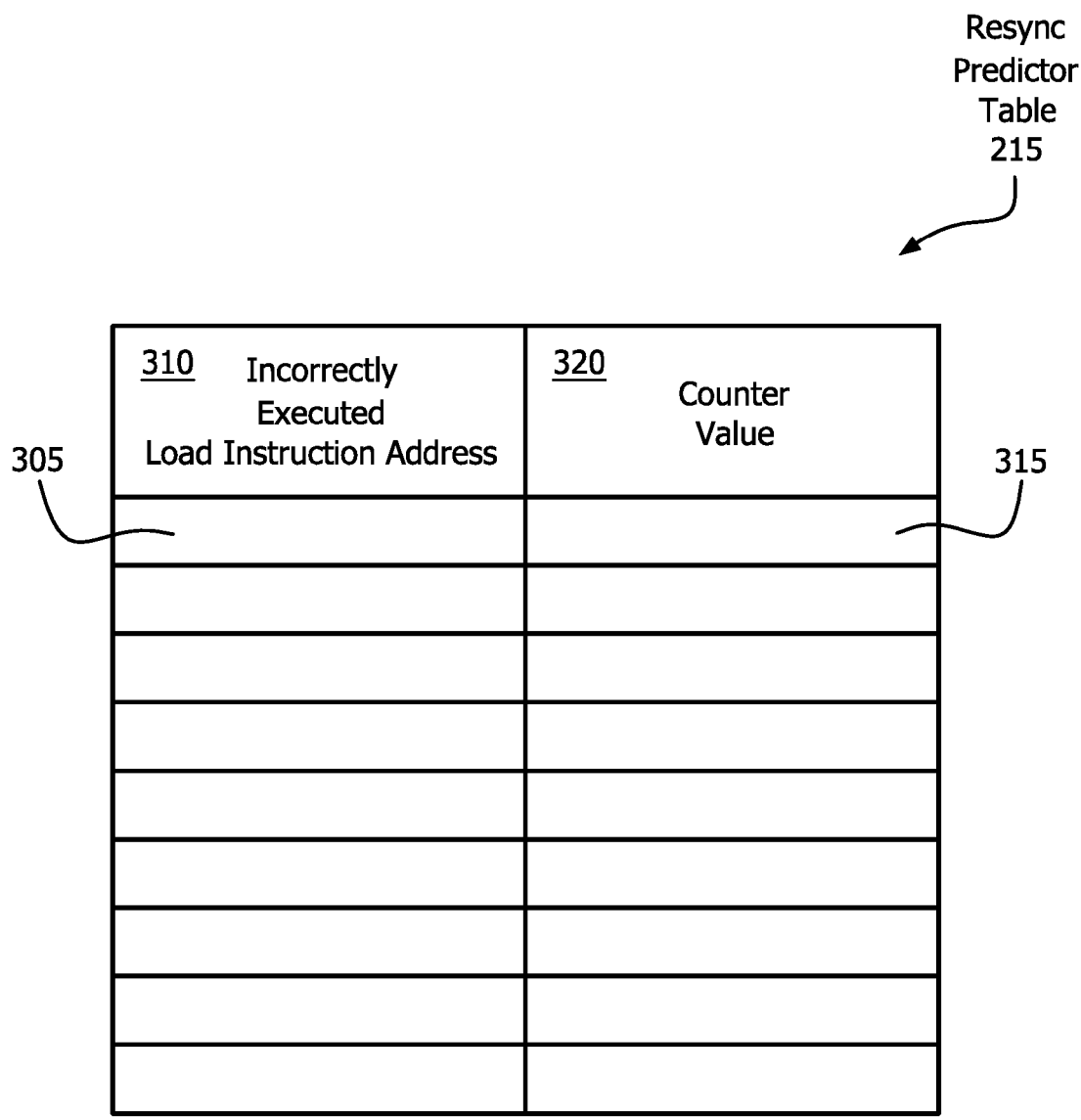
FIG. 3 shows an example of the resync predictor table used in the microprocessor of FIG. 2.

FIG. 3 shows details of an example resync predictor table 215. Referring to FIGS. 2 and 3, the resync predictor 205 in the LSU 140' sends a resync signal 230 to the memory 210 in the enhanced instruction decoder 110'. The resync signal 230 indicates to the enhanced instruction decoder 110' that a particular load instruction was incorrectly executed. The memory 210 of the enhanced instruction decoder 110' stores the address of the particular load instruction in a first field 305 of a first column 310 in the resync predictor table 215, and stores a counter value (e.g., 2 bits) in a second field 315 of a second column 320 of the resync predictor table 215. The counter value indicates how many times the particular load instruction has been reported by a resync signal 230 as having been incorrectly executed. The counter value in the second field 315 is incremented each time a resync signal 230 is received that indicates that the particular load instruction has been incorrectly executed.

Still referring to FIGS. 2 and 3, when the enhanced instruction decoder 110' decodes the particular load instruction, the address of the particular load instruction is compared with all of the fields in the first column 310 of the resync predictor table 215. If there is a match with a particular field in the first column 310, and if a counter value field in the second column 320 of the resync predictor table 215 that corresponds to the particular field in the first column 310 reaches a predetermined threshold, the memory 210 in the enhanced instruction decoder 110' sends an "in order hazard check" (IOHC) signal 240 to the resync predictor 205 in the LSU 140'. When the resync predictor 205 receives an IOHC signal 240, it will "more carefully" (non-speculatively) execute the particular load instruction, by executing it in order, (i.e., a "restricted execution mode"), rather than executing it speculatively (out-of-order), (i.e., a "speculative execution mode"), since it is made aware that the particular load has caused errors in the past, (i.e., the particular load is "dangerous" (i.e., "risky")).

As previously indicated, when the microprocessor 200 executes instructions in order, rather than speculatively executing instructions out-of-order, the efficiency of the microprocessor 200 is reduced. Thus, it would be desirable to selectively change the mode of the particular load instruction from a "restricted execution mode" to a "speculative execution mode", and to operate in the "speculative execution mode" as much as possible.

When load instructions, which are marked "IOHC", are executed successfully without forwarding data from a prior store, the LSU 140' determines that future load instructions from this address are less "risky" to execute speculatively by the LSU 140'. Thus, the IOHC marked load checks to see if there is at least one older store to the same address as the load, which is not committed (has not written its value to memory), when the load successfully executed in order. Once the LSU 140' determines the "risk" associated with the particular load instruction has been substantially reduced, the resync predictor 205 in the LSU 140' sends a strength counter signal 250 to the memory 210, which decrements the counter value in the second field 315 in the second column 320 of the resync predictor table 215, and thus the particular load instruction is processed in accordance with a speculative execution mode.

Figure 4A:
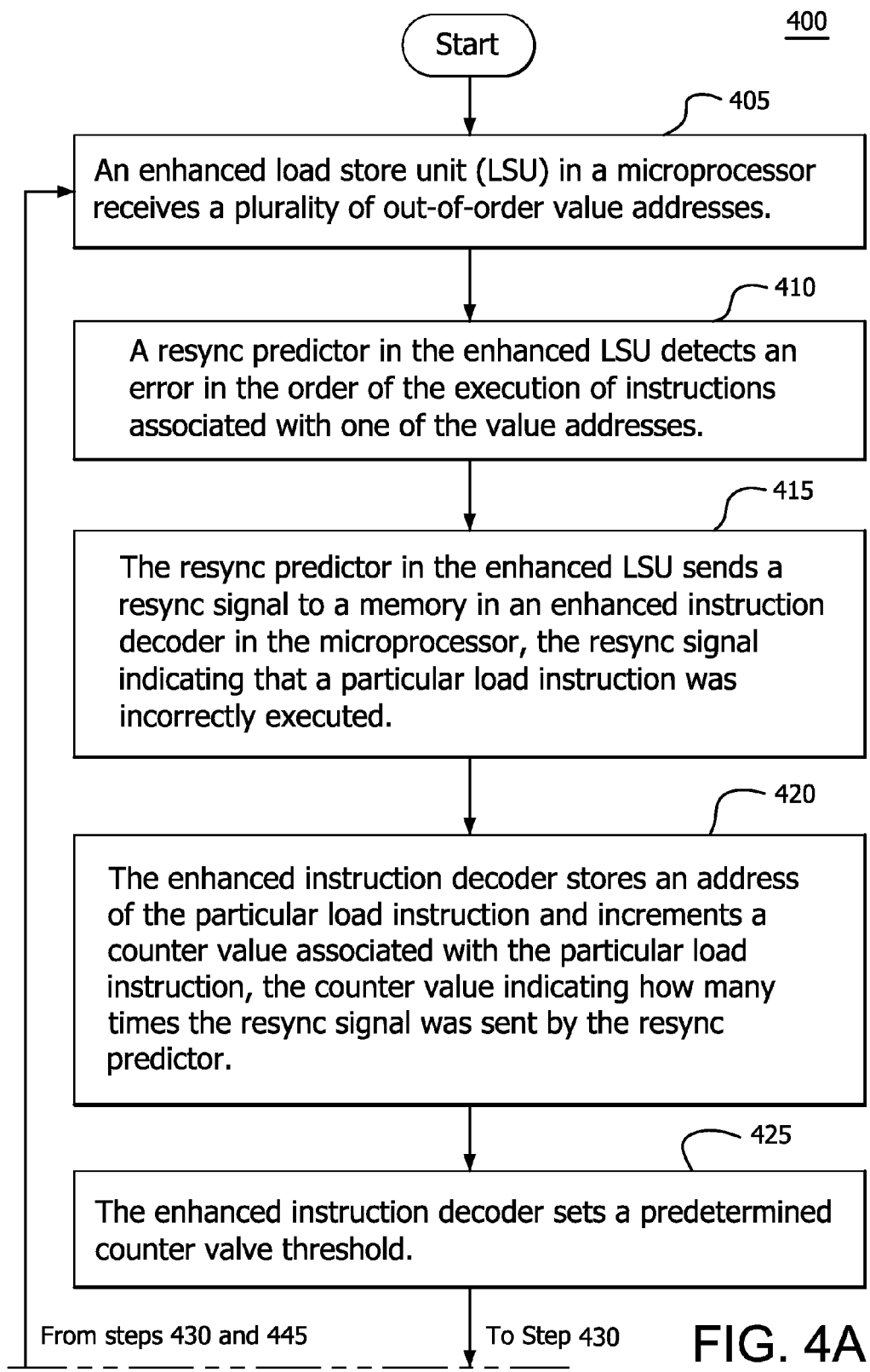
FIGS. 4A and 4B, taken together, are a flow diagram of a procedure for executing loads using the microprocessor of FIG. 2.
Figure 4B:
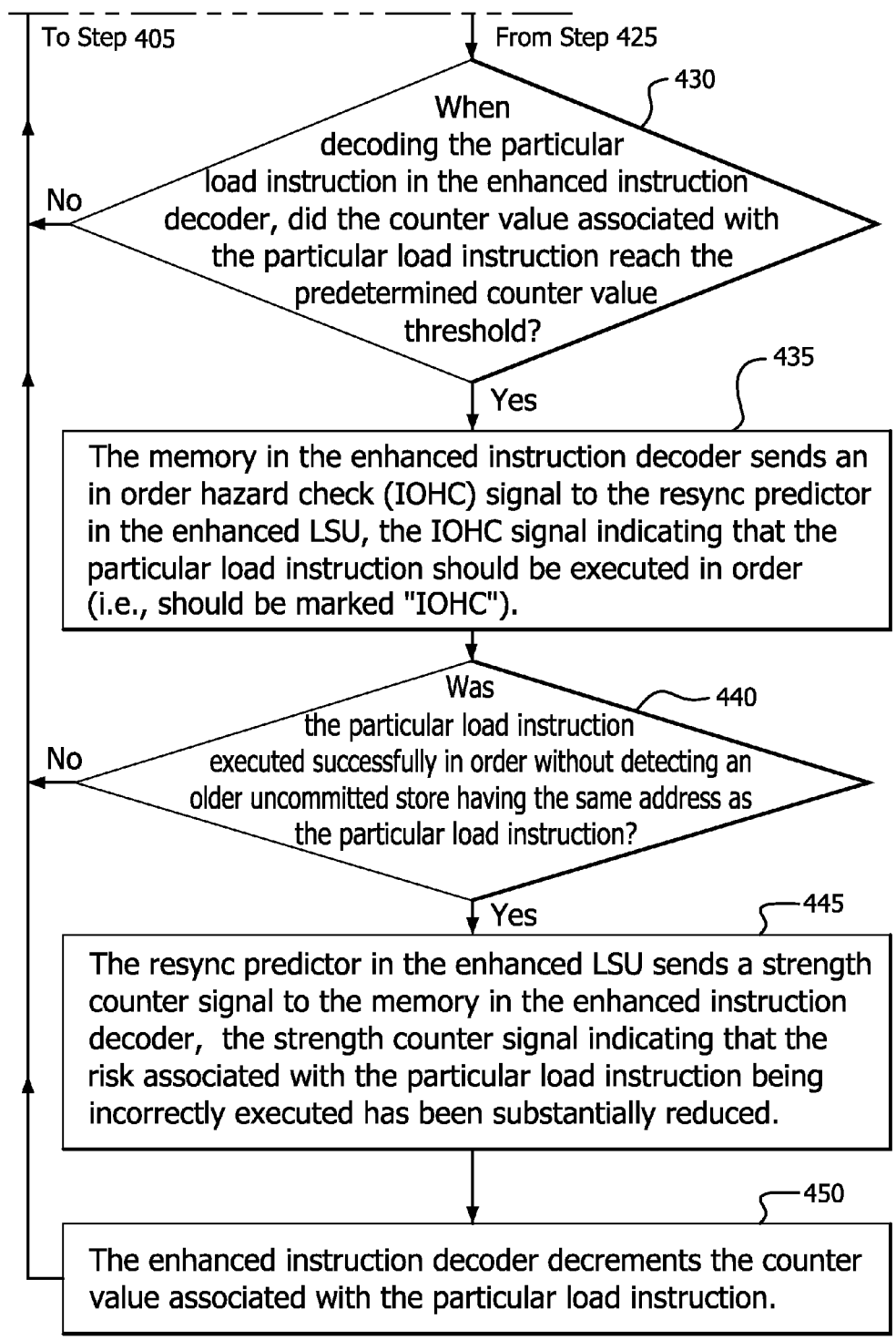

FIGS. 4A and 4B, taken together, are a flow diagram of a procedure 400 for executing load instructions using the microprocessor 200 of FIG. 2. Referring to FIGS. 2 and 4A, in step 405, the enhanced LSU 140' in the microprocessor 200 receives a plurality of out-of-order value addresses 174. In step 410, the resync predictor 205 in the enhanced LSU 140' detects an error in the order of the execution of instructions associated with one of the value addresses 174. In step 415, the resync predictor 205 in the enhanced LSU 140' sends a resync signal 230 to the memory 210 in the enhanced instruction decoder 110' in the microprocessor 200, the resync signal 230 indicating that a particular load instruction was incorrectly executed.

In step 420 of the procedure 400, the enhanced instruction decoder 110' stores an address of the particular load instruction (e.g., in a first field 305 of the resync predictor table 215 of the memory 210 as shown in FIG. 3), and increments a counter value associated with the particular load instruction (e.g., that is stored in a second field 315 of the resync predictor table 215 as shown in FIG. 3), the counter value indicating how many times the resync signal 230 was sent by the resync predictor 205 for that particular load. In step 425, the enhanced instruction decoder 110' sets a predetermined counter value threshold.

In step 430, when the particular load instruction is decoded by the enhanced instruction decoder 110', a determination is made as to whether the counter value associated with the particular load instruction has reached the predetermined counter value threshold. If the determination is negative, the procedure 400 returns to step 405. If the determination is positive, the procedure 400 continues with step 435. In step 435, the memory 210 in the enhanced instruction decoder 110' sends an in order hazard check (IOHC) signal 240 to the resync predictor 205 in the enhanced LSU 140', the IOHC signal 240 indicating that the particular load instruction should be executed in order. In step 440, a determination is made as to whether the particular load instruction was executed successfully in order without detecting an older uncommitted (did not write its value to memory) store having the same address as the particular load instruction. If the determination is negative, the procedure 400 returns to step 405. If the determination is positive, the procedure 400 continues with step 445. In step 445, the resync predictor 205 in the enhanced LSU 140' sends a strength counter signal 250 to the memory 210 in the enhanced instruction decoder 110', the strength counter signal 250 indicating that the risk associated with the particular load instruction being incorrectly executed has been substantially reduced.

In step 450, the enhanced instruction decoder 110' decrements the counter value associated with the particular load instruction (e.g., that is stored in the second field 315 of the resync predictor table 215 as shown in FIG. 3). Then, the procedure 400 returns to step 405.

Thus, the microprocessor 200 of FIG. 2 has been enhanced to not speculatively execute fetch data from memory that has a history of causing errors in the past, in order to reduce the probability of error. If it is later determined that the data was incorrectly fetched, the error can be resolved by essentially flushing the microprocessor 200 and re-executing the data.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. A method of executing load instructions using a microprocessor that includes a load store unit (LSU) and an instruction decoder, the method comprising:

the LSU receiving a plurality of out-of-order value addresses;

a resync predictor in the LSU detecting an error in the order of the execution of instructions associated with one of the value addresses;

the resync predictor in the LSU sending a resync signal to the instruction decoder, the resync signal indicating that a particular load instruction was incorrectly executed; and in response to receiving the resync signal, the instruction decoder storing an address of the particular load instruction in a first field of a table, and incrementing a counter value associated with the particular load instruction that is stored in a second field of the table, the counter value indicating how many times the resync signal was sent by the resync predictor.

2. The method of claim 1 further comprising:

the instruction decoder comparing the counter value associated with the particular load instruction to a predetermined counter value threshold; and in response to the counter value reaching the predetermined counter value threshold, the instruction decoder signaling the resync predictor to execute the particular load instruction in order.

3. The method of claim 1 further comprising:

the instruction decoder determining, when decoding the particular load instruction, whether the counter value associated with the particular load instruction reached a predetermined counter value threshold based on a comparison of the counter value and the predetermined counter value threshold; and the instruction decoder sending an in order hazard check (IOHC) signal to the resync predictor in the LSU if it is determined that the counter value associated with the particular load instruction reached the predetermined counter value threshold, the IOHC signal indicating that the particular load should be executed in order.

4. The method of claim 3 further comprising:

if the particular load instruction was executed successfully in order without detecting an older uncommitted store having the same address as the particular load instruction, the resync predictor in the LSU sending a strength counter signal to the instruction decoder, the strength counter signal indicating that the risk associated with the particular load instruction being incorrectly executed has been substantially reduced; and the instruction decoder decrementing the counter value associated with the particular load instruction that is stored in the second field of the table.

5. A method of executing load instructions using a microprocessor that includes a load store unit (LSU) and an instruction decoder, the method comprising:

the LSU receiving a plurality of out-of-order value addresses;

the LSU detecting an error in the order of the execution of instructions associated with one of the value addresses;

the LSU sending a resync signal to the instruction decoder, the resync signal indicating that a particular load instruction was incorrectly executed; and in response to receiving the resync signal, the instruction decoder storing an address of the particular load instruction, and incrementing a counter value associated with the particular load instruction, the counter value indicating how many times the resync signal was sent by the LSU.

6. The method of claim 5 further comprising:

the instruction decoder determining whether the LSU should execute the particular load instruction out-of-order or in order.

7. The method of claim 5 further comprising:

the instruction decoder comparing the counter value associated with the particular load instruction to a predetermined counter value threshold; and in response to the counter value reaching the predetermined counter value threshold, the instruction decoder signaling the LSU to execute the particular load instruction in order.

8. The method of claim 7 further comprising:

the instruction decoder determining, when decoding the particular load instruction, whether the counter value associated with the particular load reached a predetermined counter value threshold based on a comparison of the counter value and the predetermined counter value threshold; and the instruction decoder sending an in order hazard check (IOHC) signal to the LSU if it is determined that the counter value associated with the particular load instruction reached the predetermined counter value threshold, the IOHC signal indicating that the particular load should be executed in order.

9. The method of claim 8 further comprising:

if the particular load instruction was executed successfully in order without detecting an older uncommitted store having the same address as the particular load instruction, the LSU sending a strength counter signal to the instruction decoder, the strength counter signal indicating that the risk associated with the particular load instruction being incorrectly executed has been substantially reduced; and the instruction decoder decrementing the counter value associated with the particular load instruction.

10. A microprocessor comprising:

a load store unit (LSU) configured to receive a plurality of out-of-order value addresses, the LSU having a resync predictor, wherein the resync predictor is configured to detect an error in the order of the execution of instructions associated with one of the value addresses, and send a resync signal indicating that a particular load instruction was incorrectly executed; and an instruction decoder configured to receive the resync signal, store an address of the particular load instruction in a first field of a table, and increment a counter value associated with the particular load instruction that is stored in a second field of the table, the counter value indicating how many times the resync signal was sent by the resync predictor.

11. The microprocessor of claim 10 wherein the instruction decoder is configured to compare the counter value associated with the particular load instruction to a predetermined counter value threshold, and signal the resync predictor to execute the particular load instruction in order in response to the counter value reaching the predetermined counter value threshold.

12. The microprocessor of claim 10 wherein the instruction decoder is configured to determine, when decoding the particular load instruction, whether the counter value associated with the particular load reached a predetermined counter value threshold based on a comparison of the counter value and the predetermined counter value threshold, and send an in order hazard check (IOHC) signal to the resync predictor in the LSU if it is determined that the counter value associated with the particular load instruction reached the predetermined counter value threshold, the IOHC signal indicating that the particular load should be executed in order.

13. The microprocessor of claim 12 wherein the resync predictor in the LSU is configured to send a strength counter signal to the instruction decoder if the particular load instruction was executed successfully in order without detecting an older uncommitted store having the same address as the particular load instruction, the strength counter signal indicating that the risk associated with the particular load instruction being incorrectly executed has been substantially reduced, and the instruction decoder is configured to decrement the counter value associated with the particular load instruction that is stored in the second field of the table.

14. A microprocessor comprising:

a load store unit (LSU) configured to receive a plurality of out-of-order value addresses, detect an error in the order of the execution of instructions associated with one of the value addresses, and send a resync signal indicating that a particular load instruction was incorrectly executed; and an instruction decoder configured to store an address of the particular load instruction in response to receiving the resync signal, and increment a counter value associated with the particular load instruction, the counter value indicating how many times the resync signal was sent by the LSU.

15. The microprocessor of claim 14 wherein the instruction decoder is configured to determine whether the LSU should execute the particular load instruction out-of-order or in order.

16. The microprocessor of claim 14 wherein the instruction decoder is configured to compare the counter value associated with the particular load instruction to a predetermined counter value threshold, and signal the LSU to execute the particular load instruction in order in response to the counter value reaching the predetermined counter value threshold.

17. The microprocessor of claim 16 wherein the instruction decoder is configured to determine, when decoding the particular load instruction, whether the counter value associated with the particular load reached a predetermined counter value threshold based on a comparison of the counter value and the predetermined counter value threshold, and the instruction decoder is configured to send an in order hazard check (IOHC) signal to the LSU if it is determined that the counter value associated with the particular load instruction reached the predetermined counter value threshold, the IOHC signal indicating that the particular load should be executed in order.

18. The microprocessor of claim 17 wherein the LSU is configured to send a strength counter signal to the instruction decoder if the particular load instruction was executed successfully in order without detecting an older uncommitted store having the same address as the particular load instruction, the strength counter signal indicating that the risk associated with the particular load instruction being incorrectly executed has been substantially reduced, and the instruction decoder is configured to decrement the counter value associated with the particular load instruction.

* * * * *